Patented June 17, 1930

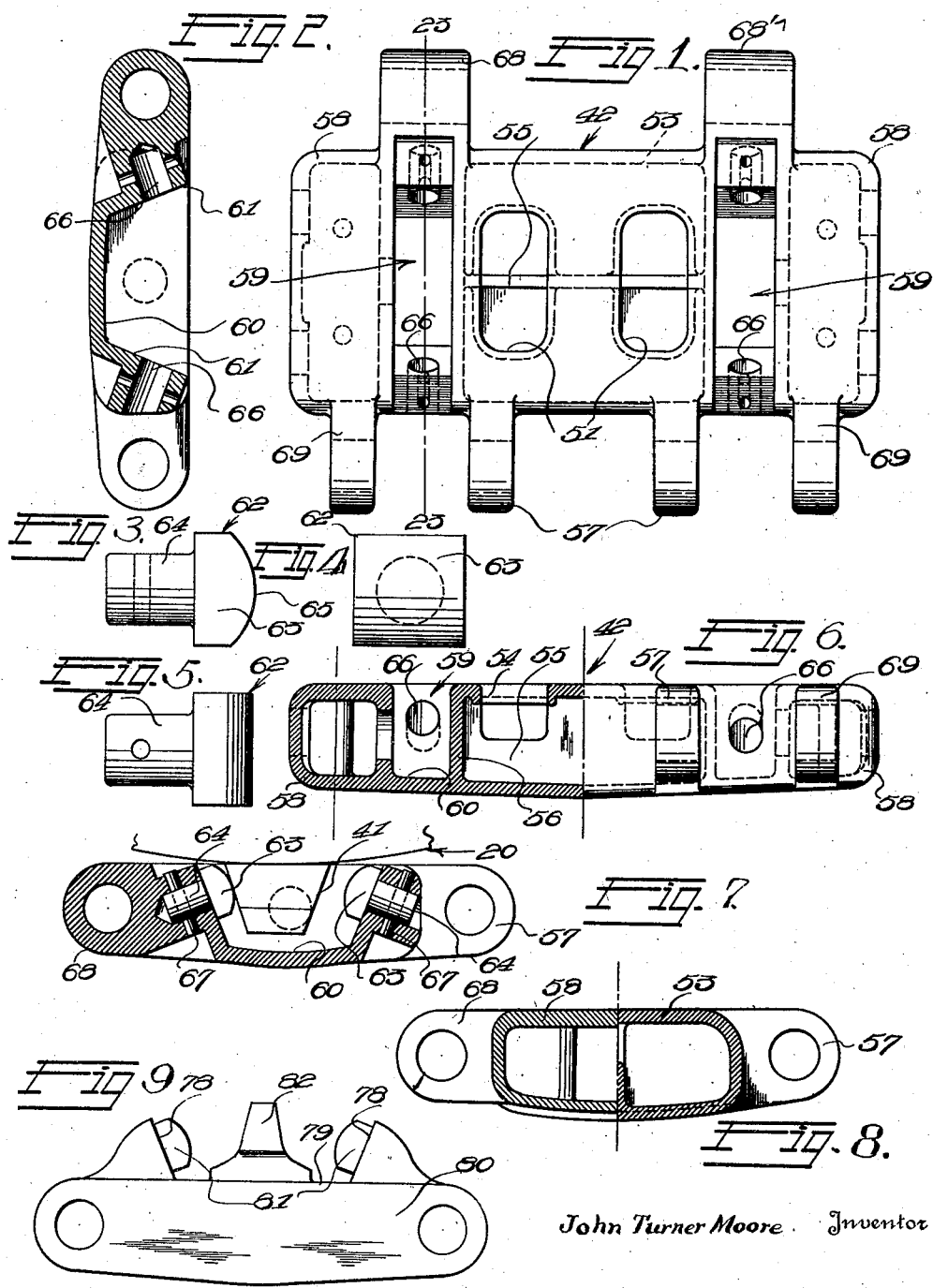

1,764,520

UNITED STATES PATENT OFFICE

JOHN TURNER MOORE, OF NEAR WERNERSVILLE, PENNSYLVANIA, ASSIGNOR, BY MESNE ASSIGNMENTS, TO REX-WATSON CORPORATION, OF CANASTOTA, NEW YORK, A CORPORATION OF NEW YORK

CREEPER ATTACHMENT FOR TRACTOR WHEELS

Application filed December 27, 1926. Serial No. 157,398.

This invention relates to an improved endless track or creeper tread device for tractors.

One object of the invention is to provide a tread member or link of comparatively light construction without detracting from the strength thereof.

A further object is to prolong the life of the tread members of such a track more or less indefinitely.

More specifically, the invention consists in producing a tread member or block of hollow construction, said member having wear plates or plugs engageable by the teeth of the wheel that runs on the track, said plates being renewable when necessary, thereby eliminating the necessity of discarding the entire member when the portions which would ordinarily be engaged by said teeth have become worn to an excessive extent. By this prolonging the usefulness of the tread member, the cost of maintenance is appreciably reduced.

With these and other objects in view, the present invention consists in certain novel details of construction, combinations and arrangements of parts, all as will hereinafter be more fully described, and the novel features thereof pointed out in the appended claims.

In the accompanying drawings,

Figure 1 is a plan view of one of the tread blocks produced in accordance with the present invention, it being understood that the track proper is composed of an articulated series of such members.

Fig. 2 is a vertical sectional view on the line 23—23 of Fig. 1.

Figs. 3, 4 and 5 are, respectively, a side, front and top plan view of one of the wear plugs used with the tread blocks.

Fig. 6 is an edge view, partly in section, of the tread block.

Fig. 7 is a view similar to Fig. 2, but showing the wear plugs in the tread block and one of the teeth of one of the chain wheels engaging one of said plugs.

Fig. 8 is a transverse vertical sectional view on the tread block.

Fig. 9 is a side elevation of a modified form of tread block designed for use with chain wheels having teeth which do not project beyond the periphery of the wheel.

As will be understood, the endless track is composed of a series of articulated links or tread blocks 42, each block being formed at opposite edges with a plurality of apertured ears 57 for the reception of hinge pins (not shown) for pivotally connecting together adjacent links of the chain or tract.

Each block 42 preferably consists of a hollow casting, the intermediate portion 53 being hollow, as shown, with openings 54 extending from said hollow interior to the surface of said member. A vertically disposed, longitudinally, extending reinforcing rib 55 is arranged within the intermediate portion, said rib merging into the end walls 56. The intermediate portion is provided at one edge with a pair of ears 57, and located between the ends 58 and the intermediate portion 53 of each tread block, in the wheel engaging surface of said block, are cavity parts 59. Each of these parts is concavo-convex in form to provide a cavity or depression 60 having converging end walls 61. These cavities are adapted to receive the teeth 41 of the wheel or wheels and, from Fig. 7, it may be clearly seen that the length of the cavity is considerably greater than the length of the tooth. This difference in length of the tooth and cavity is for the purpose of permitting the tooth to play, so to speak, in the cavity in order that there may be provided an allowance for slack, etc.

In order that the tread blocks may last indefinitely, the converging walls 61 of each cavity are provided with wear plates or plugs 62 removably secured therein. Each of these plugs is made of hard metal and includes a head 63 having a shank 64. The head 63 is semi-cylindrical, as indicated at 65, to form a rocking surface for the teeth of the wheels. To fasten the wear plug 62 in place, the cavity portion of the tread block is provided with holes 66 adapted to receive the shanks 64 of said plugs and pins 67 are secured in alined holes extending through the tread block and shank of the plug. If the chain is employed on a trailer, it will be obvious that the walls of the cavity 60 or the wear plugs 62 will function as teeth to push the teeth 41 of the wheels thereby turning the latter.

One end of each of the cavity portions 59 of the tread block is provided with an apertured ear 68, and the opposite end of each of the extremities of the tread block is provided with an apertured lug 69, the lugs 57, 68 and 69 receiving the pins 70 that are employed for pivotally connecting the juxtaposed tread blocks.

In Fig. 7, the teeth 41 are illustrated as projecting beyond the periphery of wheel 20 but, if desired, in lieu of such a construction wheels with sockets in their peripheries may be utilized. If wheels of this character are employed, the tread blocks are modified in construction as illustrated in Fig. 9, wherein the inclined walls 78, correspond to the inclined walls 61 in the cavities 60 and are arranged above the upper surfaces 79 of the tread block 80. Wear blocks 81 may also be utilized in this modified type of tread block. In this modified construction it may be necessary to provide each tread block with an upwardly extending lug or a pair of lugs 82 to engage the wheel webs and prevent undue lateral movement of the chain.

What I claim is:

1. In an endless track structure for vehicles, a tread block having an aperture therein, a wear plug including a head and shank, said shank extending into said aperture, and the head being formed of hardened metal.

2. In an endless track structure for vehicles, a tread block having a wear plug detachably connected thereto and comprising a shank, and a hardened metal head, said head having a curved wearing surface.

3. In an endless track structure for vehicles, a series of tread blocks forming part of the track, each tread block being provided with opposed apertured surfaces, and wear plugs engaging said surfaces and having shanks detachably mounted in said apertures.

4. In an endless track structure, a tread block provided with apertured ears, said tread block being of hollow formation and having converging opposed surfaces, and wear plugs associated with said surfaces.

In testimony whereof I affix my signature.

JOHN TURNER MOORE.